United States Patent
Nishio et al.

(10) Patent No.: US 10,823,042 B2
(45) Date of Patent: Nov. 3, 2020

(54) AIR BLOWING FAN DEVICE

(71) Applicant: TOYOTA JIDOSHA KABUSHIKI KAISHA, Toyota-shi, Aichi-ken (JP)

(72) Inventors: Yoshifumi Nishio, Okazaki (JP); Hiroaki Ota, Okazaki (JP); Akifumi Fujimoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/192,021

(22) Filed: Nov. 15, 2018

(65) Prior Publication Data

US 2019/0186335 A1 Jun. 20, 2019

(30) Foreign Application Priority Data

Dec. 20, 2017 (JP) .................................. 2017-243385

(51) Int. Cl.
| | |
|---|---|
| *F01P 5/06* | (2006.01) |
| *B60K 11/06* | (2006.01) |
| *F04D 25/08* | (2006.01) |
| *F04D 29/58* | (2006.01) |
| *B60K 11/04* | (2006.01) |

(Continued)

(52) U.S. Cl.
CPC ............... *F01P 5/06* (2013.01); *B60K 11/04* (2013.01); *B60K 11/06* (2013.01); *F04D 25/08* (2013.01); *F04D 29/263* (2013.01); *F04D 29/329* (2013.01); *F04D 29/5806* (2013.01); *F04D 29/545* (2013.01); *F28D 1/024* (2013.01); *F28F 9/002* (2013.01)

(58) Field of Classification Search
CPC .. F01P 5/06; B60K 11/04; B60K 11/06; F28F 9/002; F28D 1/024; F04D 29/545
See application file for complete search history.

(56) References Cited

U.S. PATENT DOCUMENTS 3,303,995 A * 2/1967 Boeckel ................ F04D 19/002
                                                        417/353
4,210,833 A * 7/1980 Neveux ...................... F01P 5/02
                                                        165/121

(Continued)

FOREIGN PATENT DOCUMENTS

JP       07063055 A * 3/1995 ................ F01P 5/02
JP       2009-030520 A    2/2009

*Primary Examiner* — Hung Q Nguyen
(74) *Attorney, Agent, or Firm* — Oliff PLC (57) ABSTRACT

An air blowing fan device includes an electric motor including a rotation shaft, and an air blowing fan including an attachment portion, a boss portion, and an outer circumferential side air blowing blades. The attachment portion is attached to the rotation shaft. The boss portion includes a tubular portion that is positioned radially outward of the attachment portion and of which the outer diameter dimension is larger than the outer diameter dimension of the electric motor, and a linkage portion. The electric motor is disposed in the tubular portion, the outer circumferential side air blowing blade extends radially outward from an outer circumferential surface of the tubular portion, the linkage portion includes a ventilation hole, and an area occupied by the electric motor and an area occupied by the outer circumferential side air blowing blade partially overlap each other in the direction in which the rotation shaft extends.

3 Claims, 5 Drawing Sheets (51) Int. Cl.
    *F04D 29/26*     (2006.01)
    *F04D 29/32*     (2006.01)
    *F28F 9/00*     (2006.01)
    *F28D 1/02*     (2006.01)
    *F04D 29/54*     (2006.01)

(56) References Cited

U.S. PATENT DOCUMENTS

| | | | | |
|---|---|---|---|---|
| 4,548,548 A * | 10/1985 | Gray | ............ | F01P 5/06 123/41.49 |
| 4,685,513 A * | 8/1987 | Longhouse | ............ | F01P 5/06 123/41.49 |
| 5,929,544 A * | 7/1999 | Maekawa | ............ | F04D 25/06 310/62 |
| 5,967,764 A * | 10/1999 | Booth | ............ | H02K 9/06 416/169 A |
| 6,600,249 B2 * | 7/2003 | Nelson | ............ | F01P 7/048 123/41.12 |
| 6,755,157 B1 * | 6/2004 | Stevens | ............ | F04D 29/582 123/41.49 |
| 7,244,110 B2 * | 7/2007 | Hong | ............ | F04D 25/082 310/62 |
| 7,287,576 B2 * | 10/2007 | O'Brien | ............ | B60H 1/00328 165/121 |
| 8,091,177 B2 * | 1/2012 | Cote | ............ | F04D 29/329 16/203 |
| 10,107,301 B2 * | 10/2018 | Evers | ............ | H02K 9/06 |
| 2004/0223845 A1 * | 11/2004 | Caplan | ............ | F01D 5/34 415/173.1 |

* cited by examiner

RELATED ART

AIR BLOWING FAN DEVICE

INCORPORATION BY REFERENCE

The disclosure of Japanese Patent Application No. 2017-243385 filed on Dec. 20, 2017 including the specification, drawings and abstract is incorporated herein by reference in its entirety.

BACKGROUND

1. Technical Field

The present disclosure relates to an air blowing fan device that blows air to a heat exchanger (such as radiator) installed in a vehicle. Specifically, the present disclosure relates to an air blowing fan provided in an air blowing fan device.

2. Description of Related Art

An air blowing fan device that blows air to a heat exchanger is disposed in the vicinity of the heat exchanger such as a radiator or a condenser that is disposed in an engine compartment of a vehicle. An electric air blowing fan device, which is a kind of such an air blowing fan device, is provided with an electric motor and an air blowing fan that is attached to a rotation shaft of the electric motor.

Figure 4:
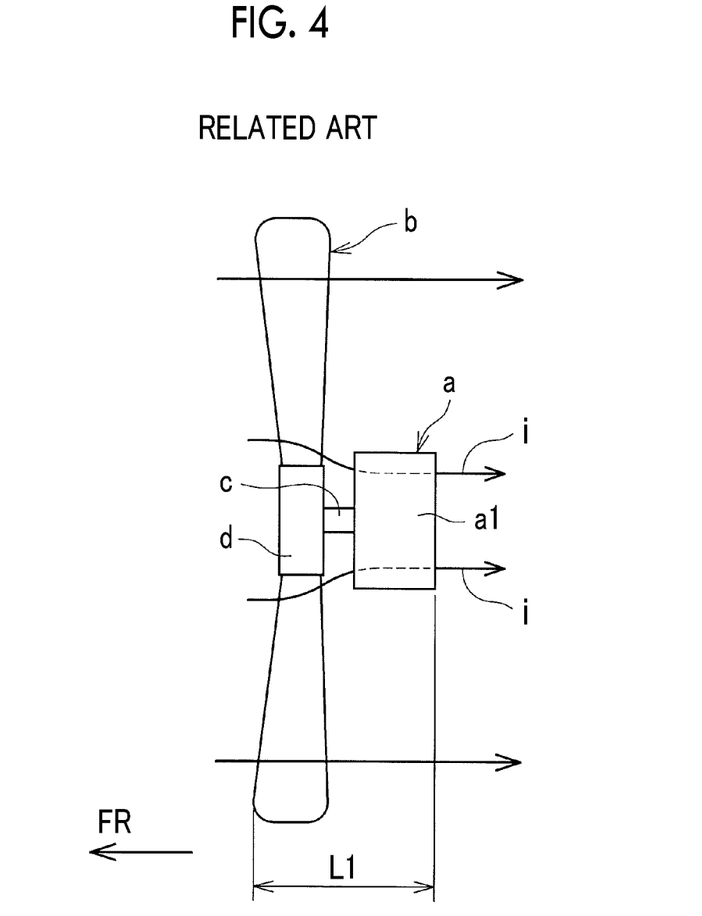
FIG. 4 is a side view illustrating an electric motor and an air blowing fan of a general electric air blowing fan device in the related art.

FIG. 4 is a side view illustrating an electric motor a and an air blowing fan b of a general electric air blowing fan device in the related art. An arrow FR in the drawing represents a vehicle front side. As illustrated in FIG. 4, a hub portion d of the air blowing fan b is attached to a rotation shaft c of the electric motor a and when the electric motor a is operated, the air blowing fan b rotates such that air is blown (refer to arrows in FIG. 4). In order to cool the electric motor a, an opening (not shown) is formed in each of front and rear surfaces of a housing al of the electric motor a such that a portion of the blown air passes through the housing al of the electric motor a (refer to arrows i in FIG. 4).

Figure 5:
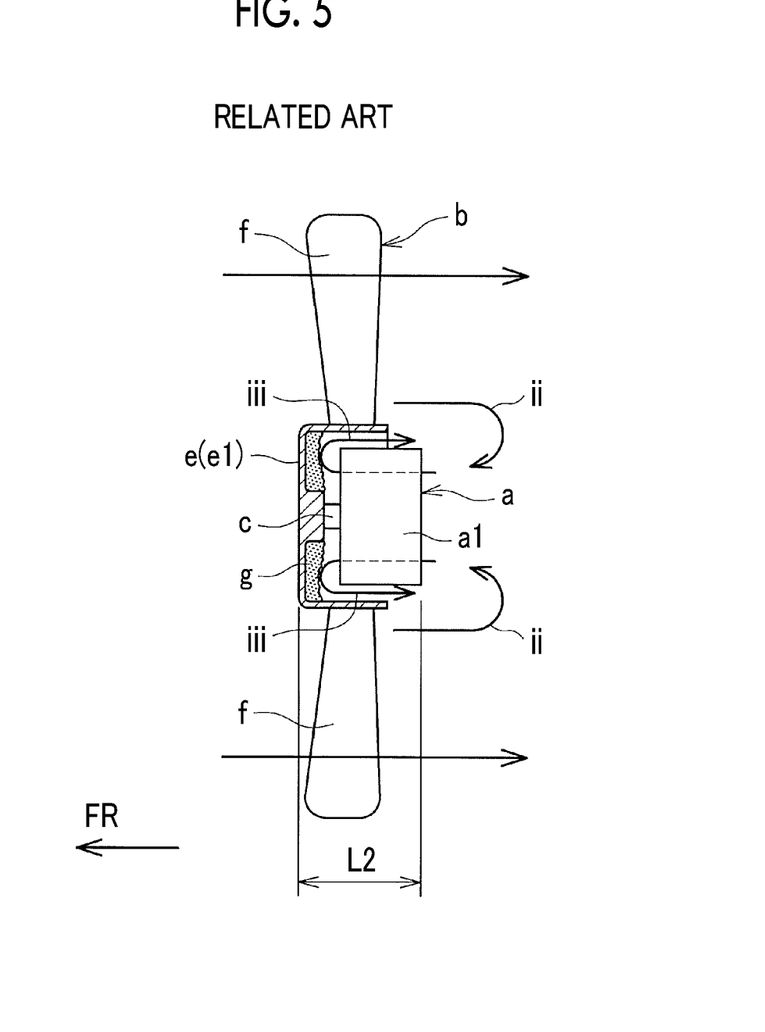
FIG. 5 is a side view illustrating an electric motor and an air blowing fan of an air blowing fan device in the related art, in which the electric motor is disposed in a boss portion of the air blowing fan.

As disclosed in Japanese Unexamined Patent Application Publication No. 2009-030520 (JP 2009-030520 A), there is a known configuration in which the central portion of an air blowing fan is provided with a boss portion and an electric motor is disposed inside the boss portion for the purpose of reduction in thickness of the air blowing fan device (reduction in dimension in vehicle front-rear direction). FIG. 5 is a side view illustrating an electric motor a and an air blowing fan b (sectional view illustrating portion of air blowing fan b) of such an air blowing fan device. An arrow FR in the drawing represents a vehicle front side. As illustrated in FIG. 5, the central portion of the air blowing fan b is provided with a bottomed cylindrical boss portion e that is open to a vehicle rear side and the boss portion e is attached to a rotation shaft c of the electric motor a such that the electric motor a is disposed inside the boss portion e. In the case of the above-described configuration, the electric motor a is disposed inward of the disposition position of an air blowing blade f that extends radially outward from an outer surface of the boss portion e (area occupied by air blowing blade f and area occupied by electric motor a overlap each other in vehicle front-rear direction). Therefore, it is possible to achieve reduction in thickness of the air blowing fan device (dimension L2 in FIG. 5 is smaller than dimension L1 in FIG. 4) and it is possible to achieve an effect of improving the design or the like of a vehicle.

SUMMARY

When the electric motor a is operated and the air blowing fan b rotates such that air is blown, a portion of the blown air is drawn to the central side behind the boss portion e and a direction in which the blown air flows is reversed such that the blown air flows into the boss portion e (refer to arrows ii in FIG. 5). The blown air (air) that flows into the boss portion e passes through an opening in a rear surface of a housing a1 of the electric motor a and flows inside the housing a1 to contribute to the cooling of the electric motor a. Thereafter, the blown air passes through an opening in a front surface of the housing al and is discharged from the housing al of the electric motor a. The air discharged from the housing a1 of the electric motor a collides with a front wall e1 of the boss portion e, so that a direction in which the air flows is reversed again and the air is discharged from a rear side of the boss portion e (refer to arrows iii in FIG. 5).

In a case where air flows inside the boss portion e as described above, air stagnation occurs in the vicinity of the front wall e1 of the boss portion e. That is, the flow rate of air in the vicinity of the front wall e1 of the boss portion e is decreased. Therefore, in a situation in which dust flows into the boss portion e along with air, the dust may be accumulated in the vicinity of the front wall el of the boss portion e (symbol "g" in FIG. 5 represents accumulated dust). When the amount of dust g accumulated in the vicinity of the front wall e1 of the boss portion e becomes large, the weight of the air blowing fan b is unbalanced. Being unbalanced in weight of the air blowing fan b causes vibration at the time of rotation of the air blowing fan b, which is not desirable.

The present disclosure provides a configuration for an air blowing fan provided with a boss portion positioned at the central portion thereof, with which it is possible to suppress accumulation of dust in the boss portion.

An aspect of the present disclosure relates to an air blowing fan device including an electric motor and an air blowing fan. The electric motor includes a rotation shaft and the air blowing fan includes an attachment portion, a boss portion, and an outer circumferential side air blowing blades. The attachment portion is attached to the rotation shaft of the electric motor. The boss portion includes a tubular portion that is positioned radially outward of the attachment portion and of which the outer diameter dimension is larger than the outer diameter dimension of the electric motor and a linkage portion that links the attachment portion and the tubular portion to each other. The electric motor is disposed in the tubular portion. The outer circumferential side air blowing blade extends radially outward from an outer circumferential surface of the tubular portion. The linkage portion includes a ventilation hole that penetrates the linkage portion in a direction in which the rotation shaft extends. An area occupied by the electric motor and an area occupied by the outer circumferential side air blowing blade partially overlap each other in the direction in which the rotation shaft extends.

In the case of the air blowing fan device according to the aspect of the present disclosure, when the electric motor is operated and the air blowing fan rotates such that air is blown, a portion of the blown air (air) passes through the ventilation hole of the boss portion and contributes to the cooling of the electric motor disposed in the boss portion. The air is discharged rearward from a rear end of the boss portion. Therefore, the flow rate of air is rarely decreased inside the boss portion and air stagnation does not occur inside the boss portion. As a result, even in a situation in which dust flows into the boss portion along with air, it is possible to suppress accumulation of dust in the boss portion, it is possible to restrain the weight of the air blowing fan from being unbalanced, and it is possible to suppress vibration at the time of rotation of the air blowing fan. Since the area occupied by the electric motor and the area occupied by the outer circumferential side air blowing blade overlap each other in the direction in which the rotation shaft extends, it is possible to achieve reduction in thickness of the air blowing fan device and it is possible to achieve an effect of improving the design or the like of a vehicle.

In the air blowing fan device according to the aspect of the present disclosure, the linkage portion may be configured as a plate-shaped inner circumferential side air blowing blade.

In the case of the air blowing fan device according to the aspect of the present disclosure, an air stream is also generated by the inner circumferential side air blowing blade (linkage portion) provided for the boss portion when the electric motor is operated and the air blowing fan rotates. That is, it is possible to further improve a cooling performance for the electric motor by positively generating an air stream in the boss portion and it is possible to reliably suppress accumulation of dust in the boss portion.

In the air blowing fan device according to the aspect of the present disclosure, the number of inner circumferential side air blowing blades may be larger than the number of outer circumferential side air blowing blades.

In the case of the air blowing fan device according to the aspect of the present disclosure, the velocity of an air stream that is generated by rotation of the outer circumferential side air blowing blade having a relatively large diameter can be made close to the velocity of an air stream that is generated by rotation of the inner circumferential side air blowing blade of which the diameter is smaller than the diameter of the outer circumferential side air blowing blade. Therefore, it is possible to suppress air stream disturbance that occurs when a difference between the velocity of an air stream flowing at a position radially outward of the boss portion and the velocity of an air stream passing through the boss portion is large.

In the case of the air blowing fan device according to the aspect of the present disclosure, the boss portion of the air blowing fan is provided with the ventilation hole that penetrates the boss portion in a direction in which the rotation shaft of the electric motor extends and the attachment portion and the tubular portion of the boss portion are linked to each other via the linkage portion. Therefore, stagnation does not occur inside the boss portion at the time of rotation of the air blowing fan and it is possible to suppress accumulation of dust in the boss portion. As a result, it is possible to restrain the weight of the air blowing fan from being unbalanced and it is possible to suppress vibration at the time of rotation of the air blowing fan. Since the area occupied by the electric motor and the area occupied by the outer circumferential side air blowing blade overlap each other in the direction in which the rotation shaft extends, it is possible to achieve reduction in thickness of the air blowing fan device and it is possible to achieve an effect of improving the design or the like of a vehicle.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described based on the drawings. In the present embodiment, a case where an aspect of the present disclosure is applied as an air blowing fan that is provided in an air blowing fan device disposed in an engine compartment of a vehicle will be described.

Figure 1:
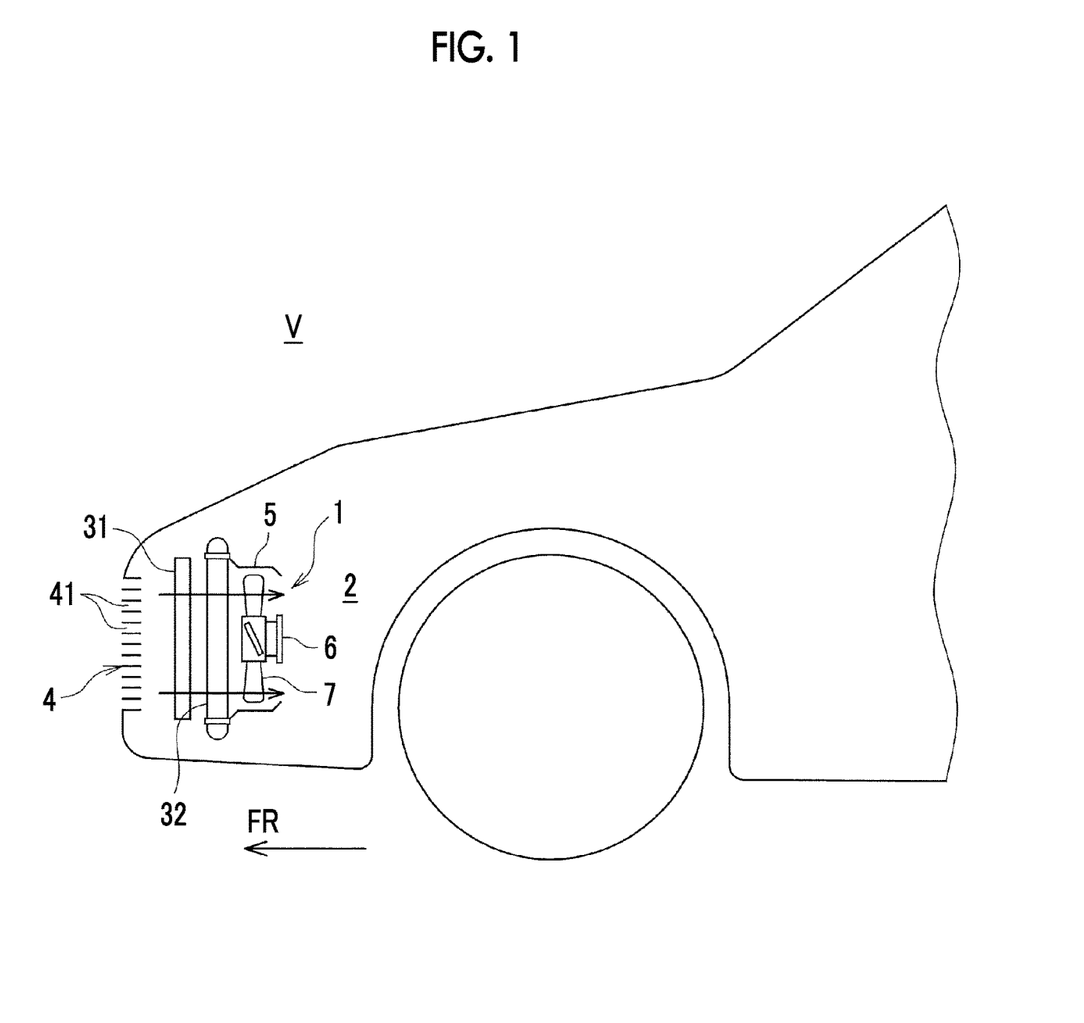
FIG. 1 is a schematic configuration view of a front portion of a vehicle, which illustrates a configuration of an air blowing fan device and the vicinity of the air blowing fan device.

Schematic Configuration of Air Blowing Fan Device and Vicinity of Air Blowing Fan Device FIG. 1 is a schematic configuration view of a front portion of a vehicle V, which illustrates a configuration of an air blowing fan device 1 according to the present embodiment and the vicinity of the air blowing fan device 1. An arrow FR in the drawing represents a vehicle front side. As illustrated in FIG. 1, a condenser 31 and a radiator 32, which are heat exchangers, are disposed in a front portion in an engine compartment 2 of the vehicle V. The condenser 31 and the radiator 32 are disposed to be arranged in a vehicle front-rear direction. In the present embodiment, the radiator 32 is disposed behind the condenser 31. The air blowing fan device 1 is disposed behind the radiator 32. The condenser 31 and the radiator 32 are arranged in series and the air blowing fan device 1 is a suction type air blowing fan device which operates to suction cooling air from the disposition position of the condenser 31 or the radiator 32. A front portion of the vehicle V is equipped with a grille 4 that is formed with a plurality of outside air intake openings 41 and outside air (air) is introduced to the condenser 31 and the radiator 32 as cooling air via the outside air intake openings 41.

The condenser 31 performs heat exchange between the outside air introduced via the outside air intake openings 41 and a coolant flowing in an air conditioning unit of the vehicle such that the coolant (coolant gas) is liquefied. The radiator 32 performs heat exchange between the outside air introduced via the outside air intake openings 41 and an engine coolant such that the engine coolant is cooled.

Figure 2:
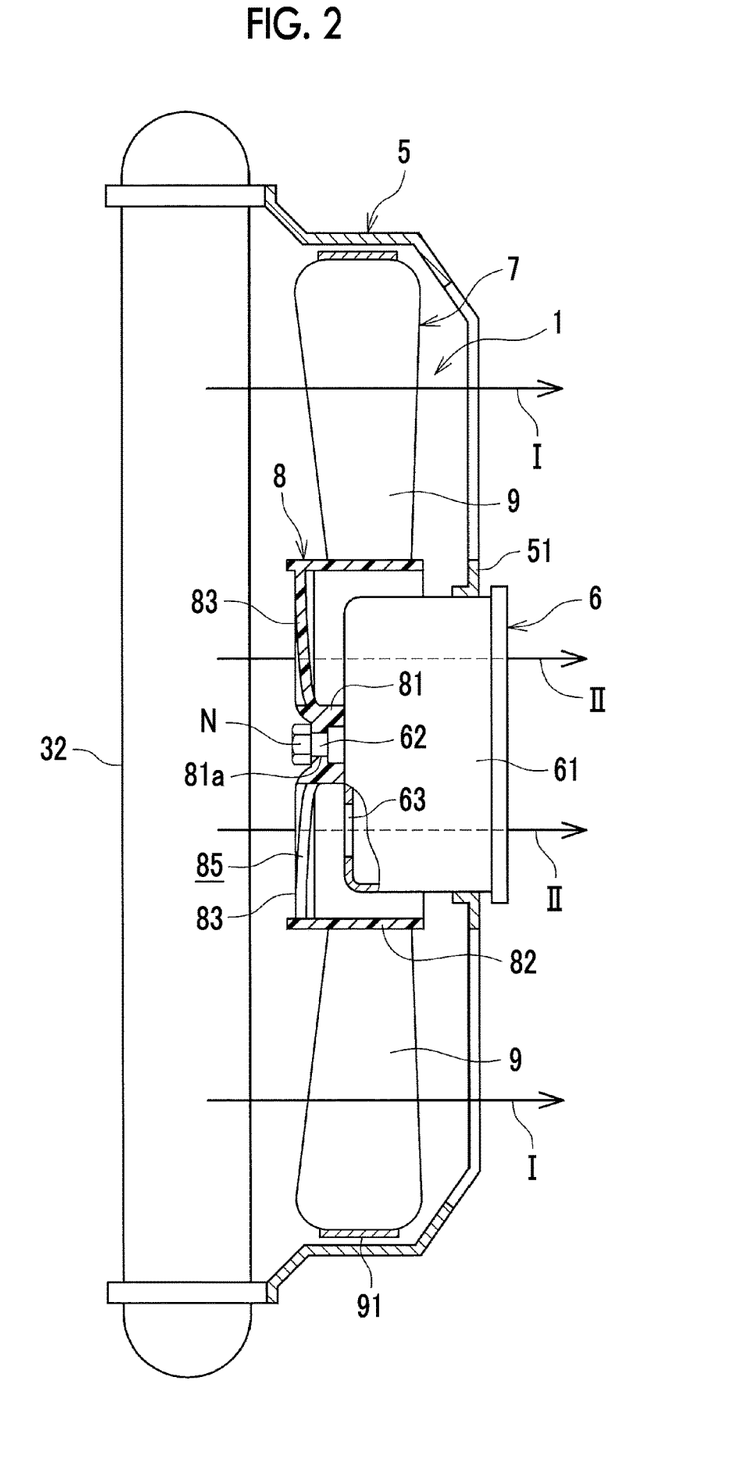
FIG. 2 is a sectional view illustrating the air blowing fan device and a radiator.

FIG. 2 is a sectional view illustrating the air blowing fan device 1 and the radiator 32. As illustrated in FIG. 2, a shroud 5 for rectification, through which air passing through the radiator 32 flows toward the air blowing fan device 1, is attached to the radiator 32. The central portion of the shroud 5 is provided with a motor attachment portion 51 and an electric motor 6 is attached to the motor attachment portion 51.

The electric motor 6 is a known electric motor and has a configuration in which a stator and a rotor (not shown) are accommodated in a housing 61. An opening (in FIG. 2, opening 63 is shown) is formed in each of front and rear surfaces of the housing 61 and an air stream (air) generated due to rotation of an air blowing fan 7 (which will be described later) passes through the housing 61 such that the electric motor 6 can be cooled.

The electric motor 6 is connected to a controller (not shown). The controller adjusts the rotation speed of the electric motor 6 by changing a ratio (duty ratio) between a time for which an electric current flows to the electric motor 6 and a time for which an electric current does not flow to the electric motor 6 such that an average electric current value becomes variable. The air blowing fan 7 disposed inside the shroud 5 is attached to a rotation shaft 62 of the electric motor 6 such that the air blowing fan 7 can integrally rotate with the rotation shaft 62. Accordingly, the controller adjusts the rotation speed of the electric motor 6 according to a cooling ability needed for the condenser 31 and the radiator 32 such that the amount of air blown due to rotation of the air blowing fan 7 is adjusted.

Configuration of Air Blowing Fan

The configuration of the air blowing fan 7 will be described.

Figure 3:
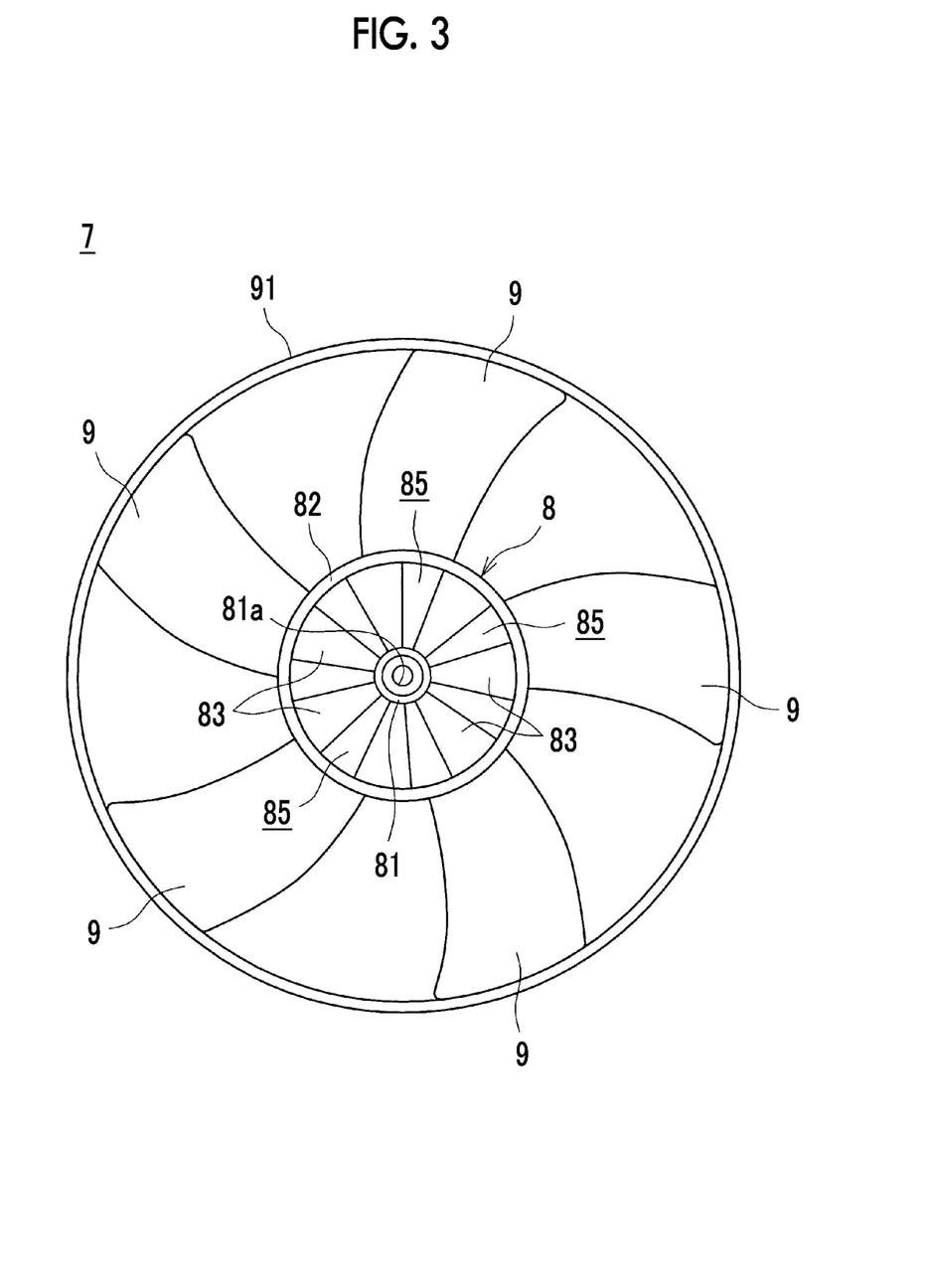
FIG. 3 is a front view of an air blowing fan.

FIG. 3 is a front view of the air blowing fan 7. The air blowing fan 7 is an axial fan formed of a synthetic resin. As illustrated in FIGS. 2 and 3, the air blowing fan 7 is provided with a boss portion 8 and a plurality of outer air blowing blades (outer circumferential side air blowing blades) 9 that extend radially outward from an outer surface of the boss portion 8.

The boss portion 8 is provided with an attachment portion 81 attached to the rotation shaft 62 of the electric motor 6 and a tubular portion 82 that is provided radially outward of the attachment portion 81.

The outer diameter dimension of the attachment portion 81 is set to be larger than the outer diameter dimension of the rotation shaft 62 of the electric motor 6 and a through-hole 81a is formed in the central portion of the attachment portion 81. The inner diameter dimension of the through-hole 81a coincides with the outer diameter dimension of the rotation shaft 62 of the electric motor 6 (in present specification, "being coincide with each other" also means "being approximately coincide with each other"). The thickness dimension of the attachment portion 81 (dimension in direction along central line of through-hole 81a; dimension in front-rear direction) is set to be smaller than the length dimension of the rotation shaft 62 of the electric motor 6. The rotation shaft 62 of the electric motor 6 is inserted into the through-hole 81a and a nut N is screwed onto a male screw portion (male screw portion protruding from front surface of attachment portion 81) formed on a tip end portion of the rotation shaft 62 such that the attachment portion 81 is attached to the rotation shaft 62 of the electric motor 6. In this manner, the air blowing fan 7 is attached to the rotation shaft 62 of the electric motor 6 such that the air blowing fan 7 can integrally rotate with the rotation shaft 62. A configuration for attaching the attachment portion 81 of the boss portion 8 to the rotation shaft 62 of the electric motor 6 is not limited to the above-described configuration.

The outer diameter dimension of the tubular portion 82 is larger than the outer diameter dimension of the electric motor 6 and the electric motor 6 is disposed in the tubular portion 82. Specifically, the tubular portion 82 is formed to have a cylindrical shape of which the outer diameter dimension is set to be approximately one-third of the outer diameter dimension of the air blowing fan 7 and the tubular portion 82 covers the outer periphery of the electric motor 6 in a state where the attachment portion 81 is attached to the rotation shaft 62 of the electric motor 6 as described above. In the present embodiment, the position of a front edge (left edge in FIG. 2) of the tubular portion 82 is ahead of the position of a front edge of the housing 61 of the electric motor 6. The position of a rear edge (right edge in FIG. 2) of the tubular portion 82 is at the center of the electric motor 6 in the front-rear direction (in present specification, "being at center" also means "being at approximately center"). Therefore, the tubular portion 82 covers the front half of the electric motor 6.

The outer air blowing blades 9 are integrally formed with the boss portion 8 and extend radially outward from the outer surface of the boss portion 8. In the present embodiment, five outer air blowing blades 9 are disposed at equal angular intervals in a circumferential direction of the boss portion 8. Outer circumferential ends of the outer air blowing blades 9 are connected to each other via a ring member 91. When the electric motor 6 is operated and the air blowing fan 7 rotates, an air stream that proceeds from the vehicle front side to the vehicle rear side is generated due to rotation of the outer air blowing blades 9.

According to the present embodiment, the electric motor 6 is disposed inward of the disposition positions of the outer air blowing blades 9 (area occupied by outer air blowing blades 9 and area occupied by electric motor 6 overlap each other in vehicle front-rear direction). Therefore, it is possible to achieve reduction in thickness of the air blowing fan device 1 and it is possible to achieve an effect of improving the design or the like of the vehicle.

A feature of the present embodiment is that the attachment portion 81 and the tubular portion 82 of the boss portion 8 are linked (connected) to each other via linkage portions 83. The linkage portions 83 which link the attachment portion 81 and the tubular portion 82 to each other are disposed at equal angular intervals in a circumferential direction of the attachment portion 81 and the tubular portion 82 and the shape of the linkage portion 83 is a shape like an air blowing blade as with the outer air blowing blades 9. Hereinafter, the linkage portions 83 will be referred to as inner air blowing blades 83. Inner circumferential side ends of the inner air blowing blades (inner circumferential side air blowing blades) 83 are integrally connected to an outer surface of the attachment portion 81 and outer circumferential side ends of the inner air blowing blades 83 are integrally connected to an inner surface of the tubular portion 82, respectively. In the present embodiment, seven inner air blowing blades 83 are disposed at equal angular intervals in the circumferential direction. A space in front of the boss portion 8 and a space in the boss portion 8 communicate with each other between the inner air blowing blades 83 and holes, through which both of the above-described spaces communicate with each other, are ventilation holes 85. That is, the boss portion 8 is provided with the ventilation holes 85 that penetrate the boss portion 8 in a direction in which the rotation shaft 62 of the electric motor 6 extends and the inner air blowing blades 83 serving as the linkage portions that link the attachment portion 81 and the tubular portion 82 to each other. Therefore, when the electric motor 6 is operated and the air blowing fan 7 rotates, an air stream that proceeds from the vehicle front side to the vehicle rear side is generated due to rotation of the inner air blowing blades 83. The number of inner air blowing blades 83 is not limited to seven and is set to be larger than the number of outer air blowing blades 9. Specifically, the number of outer air blowing blades 9 and the number of inner air blowing blades 83 are experimentally set according to the outer diameter dimensions of the outer air blowing blades 9 and the inner air blowing blades 83 such that the velocity of an air stream that is generated due to rotation of the outer air blowing blades 9 and the velocity of an air stream that is generated due to rotation of the inner air blowing blades 83 coincide with each other.

Air Blowing Operation

An air blowing operation that is performed by the air blowing fan device 1 configured as described above will be described. In a case where there is a request for cooling the condenser 31 or the radiator 32 while the vehicle V is stopped or at a time when the vehicle V travels at a low speed or like, the electric motor 6 is operated and the rotation shaft 62 rotates such that the air blowing fan 7 rotates. That is, an air stream that proceeds from the vehicle front side to the vehicle rear side is generated due to rotation of the outer air blowing blades 9 and the inner air blowing blades 83. Therefore, outside air (air) introduced via the outside air intake openings 41 of the grille 4 passes through the condenser 31 and the radiator 32 and heat exchange between a coolant flowing in the condenser 31 and an engine coolant flowing in the radiator 32 is performed.

A portion of air that passes through the condenser 31 and the radiator 32 and flows at a position radially outward of the boss portion 8 flows toward the vehicle rear side after passing through the outer air blowing blades 9 (refer to arrows I in FIG. 2). A portion of air that passes through the condenser 31 and the radiator 32 and flows toward the boss portion 8 flows into the boss portion 8 after passing through the inner air blowing blades 83 (after passing through ventilation holes 85), passes through the opening 63 of the front surface of the housing 61 of the electric motor 6, and flows in the housing 61 to contribute to the cooling of the electric motor 6. Thereafter, the portion of air is discharged from the housing 61 of the electric motor 6 while passing through an opening of a rear surface of the housing 61 and flows toward the vehicle rear side (refer to arrows II in FIG. 2).

As described above, in the present embodiment, air passes through the ventilation holes 85 formed in the boss portion 8. Therefore, the flow rate of air is rarely decreased inside the boss portion 8 and air stagnation does not occur inside the boss portion 8. As a result, even in a situation in which dust flows into the boss portion 8 along with air, it is possible to suppress accumulation of dust in the boss portion 8, it is possible to restrain the weight of the air blowing fan 7 from being unbalanced, and it is possible to suppress vibration at the time of rotation of the air blowing fan 7.

Since the attachment portion 81 and the tubular portion 82 of the boss portion 8 are linked to each other via the inner air blowing blades 83, an air stream is also generated by the inner air blowing blades 83 when the air blowing fan 7 rotates.

Therefore, it is possible to positively generate an air stream in the boss portion 8, it is possible to further improve a cooling performance for the electric motor 6, it is possible to lengthen the life span of the electric motor 6, and it is possible to reliably suppress accumulation of dust in the boss portion 8. It is possible to increase the amount of air passing through the condenser 31 and the radiator 32 and it is possible to improve a cooling performance for the condenser 31 and the radiator 32.

Other Embodiments

The aspect of the present disclosure is not limited to the above-described embodiment and all modifications and applications included in the scope of claims and a scope equivalent to the scope can be made.

For example, in the above-described embodiment, the air blowing fan 7 provided with five outer air blowing blades 9 and seven inner air blowing blades 83 has been described as an example. However, the number of outer air blowing blades 9 and the number of inner air blowing blades 83 are not limited to those described above.

In the above-described embodiment, the outer diameter dimension of the boss portion 8 is set to be one-third of the outer diameter dimension of the air blowing fan 7. The aspect of the present disclosure is not limited to this and the outer diameter dimension of the boss portion 8 may be set to be any value.

The aspect of the present disclosure can be applied to an air blowing fan provided in an air blowing fan device that blows air to a heat exchanger installed in a vehicle.

What is claimed is:

1. An air blowing fan device comprising:
an electric motor including a rotation shaft; and
an air blowing fan including:
an attachment portion attached to the rotation shaft of the electric motor;
a boss portion including:
a tubular portion that is positioned radially outward of the attachment portion, the tubular portion having an outer diameter dimension that is greater than an outer diameter dimension of the electric motor, and the electric motor is disposed in the tubular portion, and
a plurality of plate-shaped inner circumferential side air blowing blades that links the attachment portion and the tubular portion to each other, the plurality of inner circumferential side air blowing blades including a ventilation hole that penetrates the inner circumferential side air blowing blades in a direction in which the rotation shaft extends, where the ventilation hole is located entirely in front of the electric motor in a front-rear direction of a vehicle and is located to overlap the electric motor when viewed from a front side in the front-rear direction of the vehicle, and the plurality of inner circumferential side air blowing blades being configured to generate an airstream by rotation of the inner circumferential side air blowing blades during operation of the electric motor that flows from the front side of the vehicle to a rear side of the vehicle in the front-rear direction of the vehicle, the airstream being configured to, in order, (i) pass through each ventilation hole of the plurality of inner circumferential side air blowing blades, (ii) pass through a housing of the electric motor, and (iii) discharge to an outside of the vehicle at the rear side of the vehicle; and
a plurality of outer circumferential side air blowing blades extending radially outward from an outer circumferential surface of the tubular portion, wherein:
an area occupied by the electric motor and an area occupied by the plurality of outer circumferential side air blowing blades partially overlap each other in the direction in which the rotation shaft extends, and
a space formed in front of the boss portion in the vehicle front-rear direction of the vehicle and a cavity formed between the boss portion and a front side of the electric motor in the vehicle front-rear direction are in fluid communication with each other in the vehicle front-rear direction by the ventilation holes in each of the plurality of inner circumferential side air blowing blades, which terminate at the cavity in front of the front side of the electric motor in the vehicle front-rear direction.

2. The air blowing fan device according to claim 1, wherein a number of the plurality of inner circumferential side air blowing blades is larger than a number of the plurality of outer circumferential side air blowing blades.

3. The air blowing fan device according to claim 1, wherein a number of the plurality of outer circumferential side air blowing blades and a number of the plurality of inner circumferential side air blowing blades are set such that a velocity of an airstream that is generated due to rotation of the plurality of outer circumferential side air blowing blades is equivalent to a velocity of the airstream generated by the rotation of the plurality of inner circumferential side air blowing blades.

* * * * *